United States Patent [19]

Tucker

[11] 3,812,473

[45] May 21, 1974

[54] STORAGE SYSTEM WITH CONFLICT-FREE MULTIPLE SIMULTANEOUS ACCESS

[75] Inventor: Stuart G. Tucker, Poughkeepsie, N.Y.

[73] Assignee: International Business Machines Corporation, Armonk, N.Y.

[22] Filed: Nov. 24, 1972

[21] Appl. No.: 309,320

[52] U.S. Cl. .............................................. 340/172.5
[51] Int. Cl. .............................................. G06f 9/18
[58] Field of Search .................................. 340/172.5

[56] References Cited

UNITED STATES PATENTS

| | | | |
|---|---|---|---|
| 3,638,198 | 1/1972 | Balogh | 340/172.5 |
| 3,699,530 | 10/1972 | Capowski et al. | 340/172.5 |
| 3,670,309 | 6/1972 | Amdahl et al. | 340/172.5 |
| 3,702,462 | 11/1972 | England | 340/172.5 |
| 3,710,328 | 1/1973 | Hunter et al. | 340/172.5 |
| 3,505,651 | 4/1970 | Barlow et al. | 340/172.5 |
| 3,593,299 | 7/1971 | Driscoll et al. | 340/172.5 |
| R27,285 | 2/1972 | Dreyer et al. | 340/172.5 |
| 3,676,860 | 7/1972 | Collier et al. | 340/172.5 |
| 3,560,935 | 2/1972 | Beers | 340/172.5 |

*Primary Examiner*—Paul J. Henon
*Assistant Examiner*—Mark Edward Nusbaum
*Attorney, Agent, or Firm*—R. W. Berray

[57] ABSTRACT

The storage system is comprised of a plurality of random access storage modules, each module having a plurality of addressable storage locations. Interleaved addressing is provided such that consecutively numbered systems addresses are contained in consecutively numbered storage modules. A plurality of requestors desiring access to a plurality of addressable locations in the storage system are provided simultaneous access to the storage system. Prior to initiating access by all the requestors, that portion of each requestors' address which is utilized to access a particular storage module, is compared with all other requestors. Logic is provided to detect when two or more requestors desire an initial access to the same storage module. On a priority basis, controls are provided to permit a sequence of individual accesses to the conflicting requestors for a number of start-up cycles until the addresses of the requestors have been incremented to a value where each will be requiring access to a different one of the storage modules. At this point, all requestors can then proceed, simultaneously, to access the sequence of storage locations desired.

Logic is also provided to respond to the initial conflict detection to provide variable amounts of delay to the accessed operands by the various requestors to present the first and all subsequent operands accessed by each requestor, simultaneously, to a utilization device.

8 Claims, 16 Drawing Figures

1 X 4 CROSS POINT

4 X 3 CROSS POINT

PATENTED MAY 21 1974 3,812,473

SHEET 06 OF 11

PATENTED MAY 21 1974 3,812,473

SHEET 09 OF 11

STORAGE SYSTEM WITH CONFLICT-FREE MULTIPLE SIMULTANEOUS ACCESS

BACKGROUND OF THE INVENTION

This invention relates to a storage system for a data processing system and more particularly to a storage system which permits simultaneous access to the storage system by a plurality of requestors.

The preferred environment of the storage system of the present invention is with a type of data processing system known as a vector processor. A vector processor combines corresponding addressable elements, of a series of elements which make up a vector, to produce a result vector. An arithmetic and logic unit is provided to combine two or more elements from two or more vectors to produce a result vector. To provide a high performance vector processor, it is desirable to present the two or more operands representing elements of the vectors on a regular basis and at a cycle time equivalent to the cycle time of the arithmetic units such that access to elements and the result of the computation can be available on each cycle of the system.

In prior general purpose data processing systems which are adapted for the processing of vectors, a separate buffer storage mechanism is usually required. For example, if two or more vectors are to be combined, and these vectors are initially identified by an address in the data processing system main storage, the main storage must first be accessed to store the vector in an associated buffer. When the vectors have been transferred to the buffer device, the buffer device can be accessed on a cycle basis to present corresponding elements of the vectors to the arithmetic and logic unit.

It is a primary object of this invention to provide a main storage system in a data processing system which can provide access to two or more sequences of addressable operands simultaneously.

It is a further more specific object of this invention to provide a storage system for use in a vector processor wherein simultaneous access to the storage system is provided to allow corresponding elements of two or more vectors to be presented to an arithmetic and logic unit on a cyclic basis.

One method of providing, essentially, simultaneous access to a storage system is represented by U.S. Pat. RE No. 26,087, assigned to the assignee of this invention. This patent discloses the concept of interleaved storage. That is, a plurality of independent storage modules are utilized to make up the total storage system. The addresses of consecutively numbered operands to be accessed from the storage system are distributed in consecutively numbered storage modules. That is, operand 0 is in storage module 0, operand 1 is in storage module 1, operand 2 in storage module 2, etc. Therefore, if a requestor for access to the storage system presents a sequence of consecutively numbered addresses for access to operands in the storage system, access requests can be presented to the storage system at a rate faster than the cycle time of any one of said storage modules. When access to storage module 0 is initiated and cycling has commenced, a subsequent request for the next consecutive address could be presented to storage module 1 prior to the time storage module 0 has completed a complete cycle of access.

If each of the storage modules in an interleaved storage system were provided with an input and output bus, and the starting address of the first element of each vector were stored in unique storage modules, all of the storage modules could be cycled simultaneously to provide access to the corresponding elements of all the vectors. However, before simultaneous access can be provided to corresponding elements of each vector, it must be insured that the first element of each vector is in a unique storage module. This then requires either the programmer, system, or both to properly program the system to provide this unique addressability.

It is therefore another basic object of this invention to provide a storage system utilizing interleaved addressing in plurality storage modules, wherein simultaneous access can be provided for a plurality of requestors seeking access to sequences of operands without regard for the fact that the initial operand in two or more of the sequences may reside in the same independent storage module.

It is a more specific object of this invention to provide a storage system comprised of a plurality of independent storage modules with interleaved address capability for providing simultaneous access to corresponding elements of two or more vectors for simultaneous presentation of the corresponding elements of the vectors to a utilization device without regard for the fact that the initial element of two or more vectors may reside in the same independent storage module.

SUMMARY OF THE INVENTION

The storage system of the subject invention is comprised of a plurality of independent, random access storage modules, each module having a plurality of addressable storage locations for the storage of data. Address information presented to the storage system is comprised of low order binary bits which select a storage module, and a remainder of the higher order binary bits which access a particular location in the selected storage module. Each storage module has an input bus and an output bus such that when a particular storage location within the module is addressed, data may be stored into or fetched from that address. Consecutively numbered addresses in the total storage system are contained in consecutively numbered independent storage modules. Therefore, as the address of a requestor for access to the storage system is incremented by 1, a next consecutively numbered storage module will be selected.

In the preferred embodiment of the invention, four independent storage modules are provided to provide access for four requestors, each presenting addresses to the system for access to a sequence of storage locations. As long as each requestor desires access to a storage module different from that being accessed by any other requestor, simultaneous access to the storage modules can be provided to all of the requestors. After each access for each requestor, the address presented by the requestor is incremented to provide access to the next consecutively numbered storage module.

It is a basic feature of this invention to provide logic and sequencing apparatus for examining the address information presented by each of the requestors, prior to initiating access for the requestors. It would be impossible to provide simultaneous access to all requestors on each cycling of the storage system if the initial address presented by two or more requestors is located in the same storage module. Simultaneous access to all requestors could never be achieved since a particular storage module with a conflict would be required to cycle first for one requestor and again for a second requestor, and in some instances certain storage modules would not be accessed at all on initial access.

Prior to the initial access, the conflict for access to an initial storage module is detected and requestors having conflicts are permitted access for the initial operand in a predetermined sequence. After a predetermined number of start-up cycles, the addresses presented by all requestors will eventually be incremented to a value where each requestor is addressing a unique one of the storage modules. At this time, simultaneous access to the storage system by all requestors can be effected.

In a vector processor, the storage system must be accessed to present two or more corresponding elements from two or more identified vectors simultaneously to an arithmetic and logic unit for computation. Therefore, it is another feature of the present invention to utilize the initial determination of conflict between two or more vectors having an initial element in the same storage module, to enable a certain amount of delay for each vector in the path to the arithmetic unit to insure that when simultaneous access is allowed to all storage modules, corresponding elements from all the vectors being accessed by all the requestors arrive simultaneously at the arithmetic and logic unit for processing.

DETAILED DESCRIPTION OF THE INVENTION

Figures 1, 2:
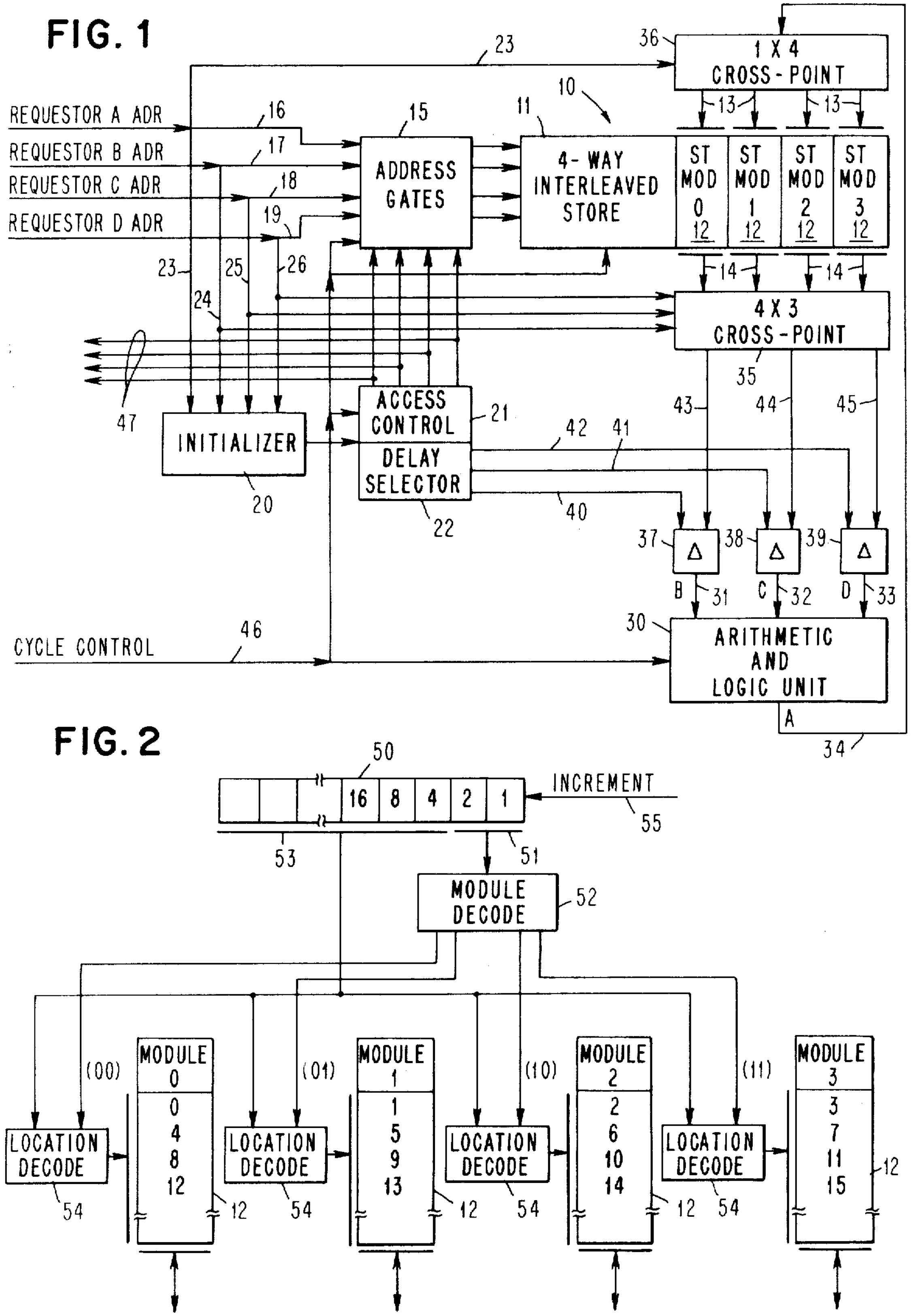
FIG. 1 is a schematic representation of the preferred embodiment of this invention in a vector processing system.
FIG. 2 is a schematic representation of the operation of an interleaved storage system.

As mentioned previously, the preferred embodiment of this invention includes a storage system for use in a vector processing system. In FIG. 1, the vectors to be processed are identified as A, B, C, and D. Vectors B, C, and D are to be combined to produce a result vector A. As will be shown, the invention is broader than consideration of access to vectors and therefore each vector will also be referred to as a requestor. In FIG. 1, there is shown a storage system 10 with necessary controls 11 to provide a four-way interleaved store. That is, the storage system 10 is comprised of a plurality of random access storage modules (ST. MOD. 0,1,2,3). Each of the storage modules 12 include means for storing data in addressable locations on a bus 13 or for reading out data on a bus 14.

Access to the storage system 10 in accordance with address information provided by requestors is presented through address gates 15. The address information from requestors A through D is gated through the address gates 15 on lines 16, 17, 18 and 19 respectively.

The basic functioning of the invention is effected by means of an initializer 20, access control 21, and delay selector 22. In the example shown, four independent storage modules are provided. Therefore, the binary permutations of the two order binary bits of the addresses presented by the requestors are utilized through the controls 11 of the storage system 10 to select a particular module 12. The remaining higher order bits of each address are then utilized to select an addressable location in the storage module selected by the two lower order bits.

In order to allow simultanesou access to the storage system 10 by each of the requestors A through D, the initializer 20 must first examine the two low order bits presented on lines 23, 24, 25 and 26 from the address information presented by requestors A, B, C and D respectively. To be more fully explained later, it is the function of the initializer 20 to detect when two or more requestors are attempting an initial access to the storage system 10 in the same storage module 12. As a result of any detection of a conflict by initializer 20, the access control 21 will be effective to gate, in a predetermined sequence, individual ones of the address information on lines 16 through 19 of requestors whose initial address conflict.

Each time the access control 21 gates the address information through address gates 15 for a particular requestor, the address for that requestor will be incremented by one by a signal on lines 47 to the requestor address reqisters, to thereby initiate a next following access to the next storage module in sequence. After a number of initial access cycles, and the incrementing of address information for a particular requestor, the access control 21 will detect the fact that all four requestors will be requesting access to the storage system 10 in unique storage modules 12. At this point in time, the access control 21 will cause address gates 15 to gate the address information on lines 16 through 19 simultaneously to the control 11 of the storage system 10 on each cycle of the storage system 10. Thereafter, data will be available on each of the output busses 14 on each succeeding cycle of storage access.

To complete a description of FIG. 1 in connection with vector processing, there is shown an arithmetic and logic unit 30 (ALU) which is to receive at its inputs 31, 32, and 33 corresponding elements of vectors B, C, and D respectively. The output 34 of the ALU 30 is a result vector A.

Since successive elements of each vector come from successive accesses to storage modules 0 through 3 in a repeatable sequence, depending on the number of elements to be accessed, a crosspoint switch 35 is provided to respond to the two low order address bits from the requestors B, C, and D, to gate all the elements of each vector to the proper input line of the ALU 30. In a like manner, a crosspoint switch 36 is provided to respond to the two low order bits of the result vector A address to gate the output 34 of the ALU 30 to the proper one of the storage modules 12.

Also shown schematically in FIG. 1 are delay elements 37, 38, and 39 which receive control signals on lines 40, 41 and 42 respectively from the delay selector 22. The other input to the delay elements for vectors B, C, and D are received from the crosspoint 35 on lines 43, 44 and 45 respectively.

As has been noted previously, the initializer 20 detects a conflict in the initial access to the storage system 10 by two or more of the requestors. Therefore, the access control 21 causes certain of the requestors to initiate individual accesses to eliminate the conflict. As has been previously noted, the ALU 30 is to receive corresponding elements from each of the vectors B, C, and D simultaneously to produce a result vector A. If, for example, requestor D is provided a number of individual accesses to the storage system 10 to eliminate a conflict, the initial element and all succeeding elements will be delayed in the delay 39 so that when simultaneous access is provided for all requestors, the elements of vector D can be combined with the corresponding elements of vectors B and C in the ALU 30.

Cycle control for the apparatus of FIG. 1 is provided on a line 46. It is the function of the invention to cause simultaneous access to the storage system 10 for all requestors on a cyclic basis such that for each cycle of access, a new set of vector elements will be presented at the input of the ALU 30 and a result element will be produced for vector A. Therefore, full utilization is made of the four storage modules on each cycle and the ALU 30 can produce a result on each cycle providing full utilization. No storage module 12 is caused to be idle and the ALU 30 is not required to wait one or more storage access cycles for operands which may have conflicted from the initial address information provided by the requestors.

A more detailed discussion will follow, but at this point it is noted that the delay elements 37, 38, and 39 provide a variable amount of delay as indicated by the delay selector 22. In operation, the number of initial access cycles provided for requestor D may be 0, 1, 2 or 3. For requestor C, the number of cycles initially may be 0, 1, or 2. For requestor B, the number of initial access cycles may be 0 or 1. The logic of the system is such that requestor A is provided with no delay. Each delay interval provided is equal to the cycle time of the storage system 10. The number of initial access cycles provided, as determined by the initializer 20 and access control 21, controls by means of lines 40, 41, and 42 from delay selector 22 the number of delay cycles required to cause corresponding elements of the vectors B, C, and D to be presented simultaneously at the input of the ALU 30.

FIG. 2 is a more detailed logical representation of a four-way interleaved storage system as seen by one of the requestors. Each of the storage modules 12 has a number of addressable word locations. The vector processing system addresses are distributed between the various modules as shown in FIG. 2. That is, module number 0 of the storage system contains system addresses 0, 4, 8, etc. Module number 1 of the storage system contains system addresses 1, 5, 9 etc. Therefore, as shown in FIG. 2, when a requestor address is provided in a register 50, the two low order bits 51 will be presented to module decoder 52 to select the proper storage module 12 for rendering the remaining address bits 53 in register 50 effective in a location decoder 54 for the selected storage module 12. Any system address in register 50 identifies the storage module number to be utilized by the permutation of the two low order bits 51 of the address. When a particular requestor is provided access to an addressable location in the storage system 10, the address will be incremented by an input on line 55 to thereby change the two low order bits 51 to the next storage module number in a repeatable sequence of the four storage modules 12.

Figure 3:
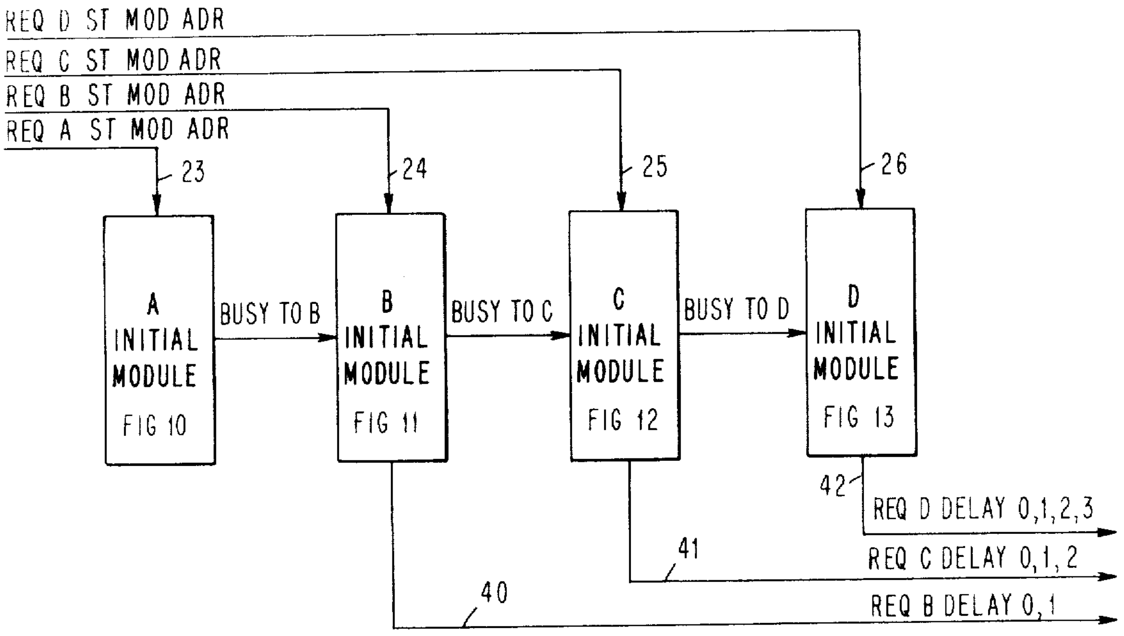
FIG. 3 is a block diagram of the initializer of FIG. 1 for detecting conflict of addresses between requestors.

The logic for determination of delay values and sequencing required for initial accesses is shown generally in FIG. 3. Where possible through out the description, the same line or logic block in various figures are given the same numerical designation. The two low order bits of the address information presented by requestors A through D are presented on lines 23 through 26 respectively. As mentioned earlier, requestor A is given preference for access to the storage system 10 and therefore the address of the initial element of the result vector, and therefore the initial storage module 12 to be accessed by vector A is given preference over all other requestors. In a like manner, the requestor B initial module address is given preference to C, and C to D. As a result, the logic of FIG. 3 provides outputs corresponding to 40, 41, and 42 signifying the number of initial accesses to be provided to the various requestors before normal simultaneous access to the storage system 10 is provided. In effect, line 40 is two lines indicating that the delay for requestor B is either 0 or 1. Line 41 represents three lines indicating that the delay for requestor C must be 0, 1, or 2 and line 42 is representative of four signal lines signifying that requestor D must be provided with 0, 1, 2, or 3 cycles of delay.

Figure 4:
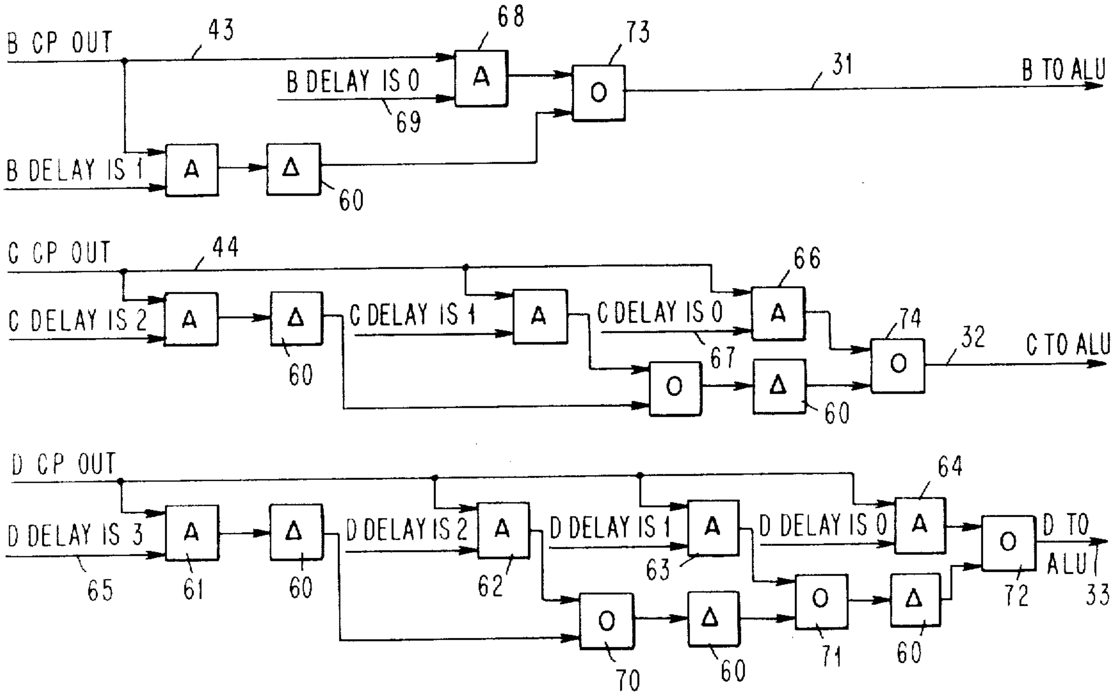
FIG. 4 is a logical representation of delays to be introduced in the path of operands accessed from the storage system for simultaneous presentation to an arithmetic and logic unit in a vector processor.

FIG. 4 shows the logic of delay elements 37, 38 and 39 of FIG. 1. These can be suitably clocked registers. In FIG. 4, each of the delay elements 60 provide one storage access cycle of delay. As mentioned earlier, although the initial storage module access for requestor D is made subservient to the initial module address of all other requestors when a conflict is recognized, the first start-up accesses to a storage system are provided fr requestor D. Therefore, requestor D may be provided with as many as three initial accesses to the storage system prior to initiating access for other requestors to thereby present corresponding elements of the vector simultaneously to the ALU 30.

As shown in FIG. 4, the output 45 of the crosspoint 35 in FIG. 1 is presented to AND circuits 61, 62, 63, and 64. Therefore, if requestor D is to be given three initial accesses to eliminate the conflict between the initial module access of requestor D and any other requestor, and no other conflicts occur, AND circuit 61 will be enabled by a line 65. In a like manner, an AND circuit 66 will be energized by a line 67 and AND circuit 68 will be enabled by a line 69. Therefore, the first element accessed for requestor D, and all succeeding elements accessed for requestor D presented on a line 45, will traverse the path defined by AND circuit 61, a first delay element 60, an OR circuit 70, a second delay element 60, an OR circuit 71, a third delay element 60, and an OR circuit 72 for presentation on line 33 to the ALU 30 of FIG. 1.

After the predetermined number of initial accesses for requestor D as determined by the access control 21 of FIG. 1, simultaneous access to the storage system 10 will be provided for requestors B, C, and D such that as the first element of requestor D is presented to OR circuit 72, the outputs 43 and 44 representing the first element for requestors B and C will be presented to OR circuits 73 and 74, from AND circuits 68 and 66 respectively. After initial accesses for requestor D therefore, succeeding cycles of access to the storage system 10 will provide succeeding elements of vectors B, C, and D on lines 31, 32 and 33 respectively.

Figure 5:
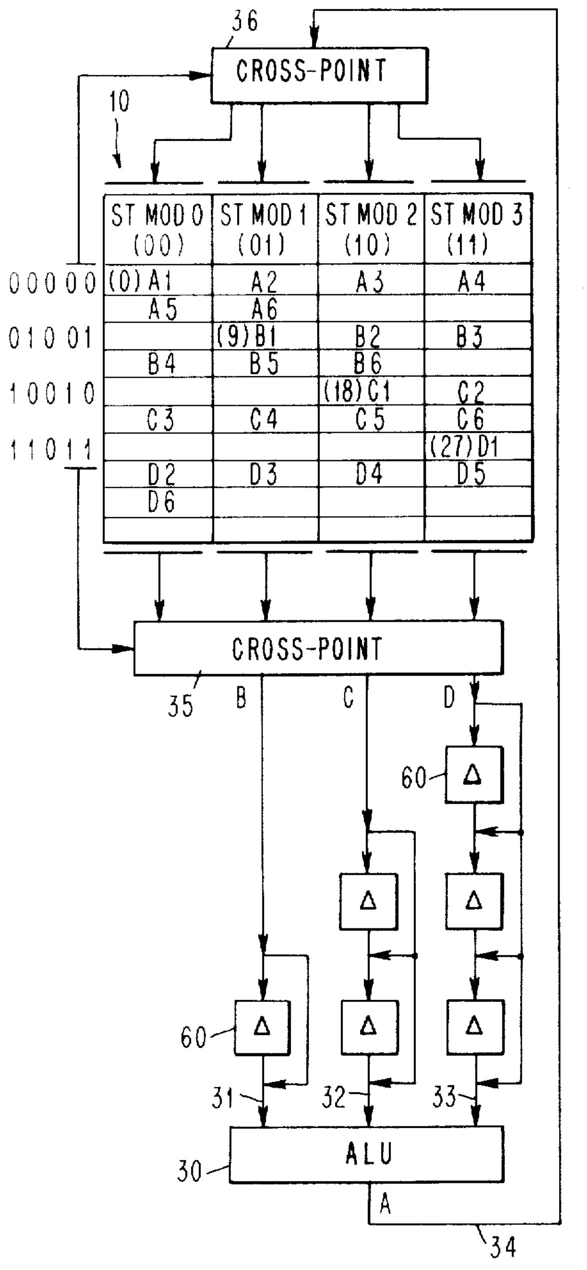
FIG. 5 is a schematic representation of a series of vectors in the storage system where the initial element in each vector is in a unique storage module.
Figure 6:
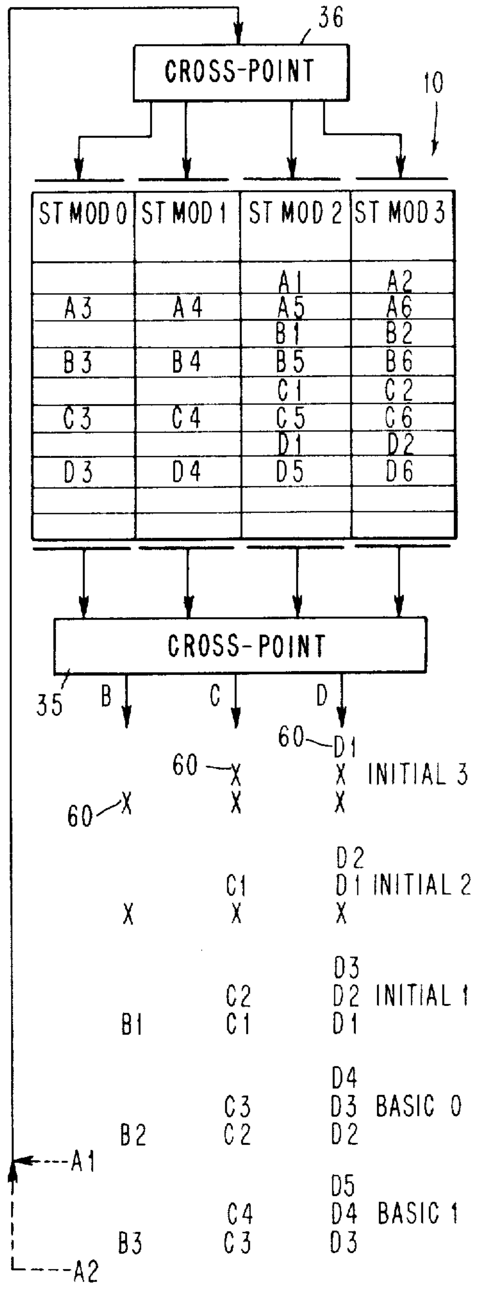
FIG. 6 is a schematic representation of a plurality of vectors wherein the initial element of four vectors are contained in the same storage module.
Figure 7:
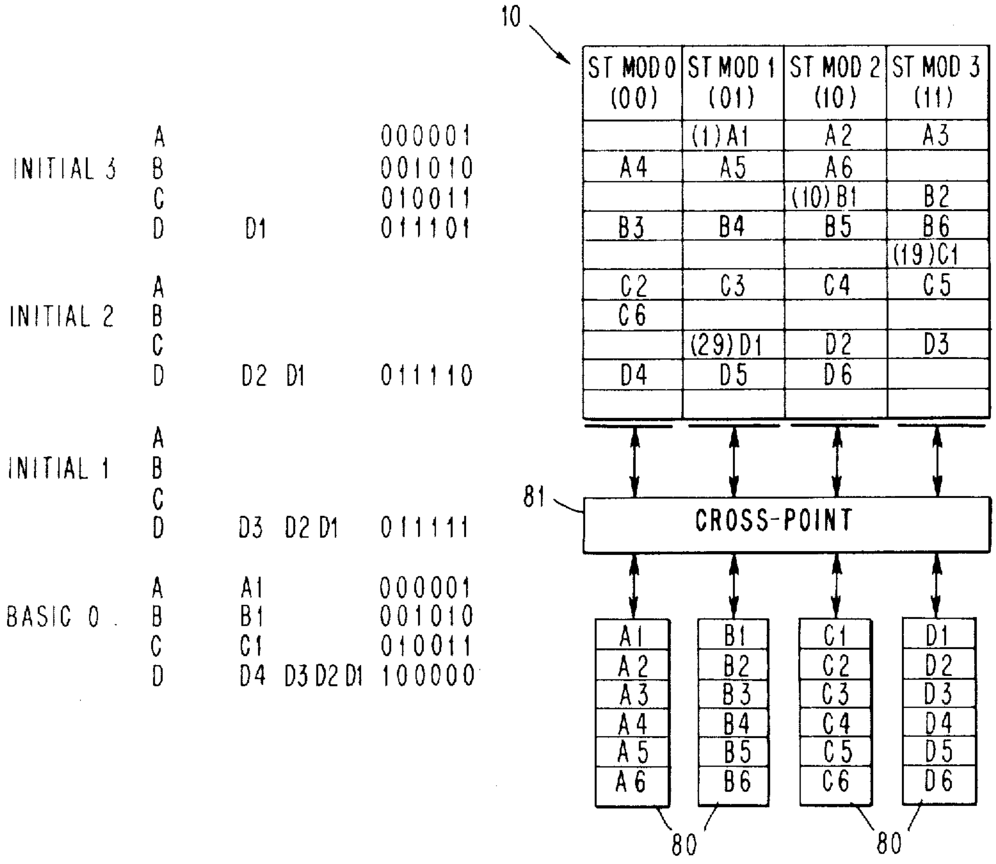
FIG. 7 is a schematic representation of an initial sequencing of individual accesses to a storage system in an input/output environment.

FIGS. 5, 6, and 7 will be utilized to explain the results achieved by the logic of the present invention. In FIG. 5, the storage system 10 is again shown to include four independent storage modules with interleaved addressing. Access to the storage system for four vectors, A through D, is to be provided. Vectors B, C, and D will be presented to the ALU 30 and the result of the operation returned to storage through crosspoint 36 for the result vector A. Each of the requestors will require access to the storage system 10 for six elements or data words. The elements of each vector are numbered consecutively. That is, A1 represents the first element of vector A, B2 represents the second element of vector B, and D3 represents the third element of vector D.

The address of the initial, or first element, for each of the vectors A through D is shown at the left of the storage system 10. That is, the initial address for vector A is system address 0. The initial address for vector B is system address 9, the first element of vector C is at address 18, and the first element of vector D is at address 27. In the example shown in FIG. 5, it is readily apparent by examination of the position of the initial element of each vector in the storage system, and the fact that the two low order bits of all of the addresses of the initial element are different, simultaneous access can be made to all four of the storage modules without conflict. As each access is made, and each of the addresses are incremented, each requestor will be given access to a unique one of the storage modules.

Since there are no conflicts for the initial access of all vectors, the storage system 10 can be accessed at all four storage modules and require no delay of any element. Therefore, on the first cycling of the storage system, elements B1, C1, and D1 can be immediately presented to the ALU 30 at inputs 31, 32, and 33 and the result A on line 34 returned through the crosspoint 36 to the addressed location of A1. On the next cycle of the storage system 10, elements B2, C2, and D2 are presented to the ALU 30 and the result returned to A2. Use of delay elements 60 is not required.

FIG. 6 is a representation of a distribution of the initial element of all of the requestors, or vectors, located in storage module 2. By means of logic to be more fully explained, the two low order bits of all of the addresses of the initial element to be accessed are presented to the initializer 20 of FIG. 1 to thereby establish the need for a delay of three for vector D, a delay of two for vector C, and a delay of one for vector B. In the representation of FIG. 6, an unfilled delay element 60 of FIG. 4 is shown with an X. Before simultaneous access for all four requestors or vectors can be effected, three initial access cycles will be required. In the example shown, the first cycle of access to the storage system 10 will be to obtain element D1 from storage module number 2. Element D1 will be placed in the first level of delay and the address for requestor D will be incremented. On the next initial access cycle, element D1 will have moved to the second level of delay. This permits access of, and insertion into the first level of delay, element D2 from storage module number 3. Also, in this cycle, element C1 is accessed from storage module 2 and inserted in the first level of delay for requestor C. On the next initial access cycle, elements D3, C2, and B1 are accessed from storage modules number 0, 3, and 2 respectively. This completes the initial accesses required to resolve all conflicts such that at the next cycling of the storage system 10, labeled basic 0 in FIG. 6, the storage system 10 will be accessed simultaneously by all four requestors to provide access to locations for A1, B2, C3 and D4. A1 represents the output 34 for the ALU 30 and is the result operand for the combination of elements B1, C1, and D1. In the remaining cycles of access to the storage system 10, simultaneous access can be maintained.

FIG. 7 represents another distribution of a sequence of operands in a storage system 10 and is further representative of the broadest aspect of the present invention. That is, the determination of the order of initial accesses for various requestors when the initial access to the storage system by two or more requestors require access to the same storage module. By examining the map of operands in the storage system 10 and the binary address information shown, it can be seen that requestors A and D both desire initial access to storage module number 1. The requestors A, B, C, and D are not specifically identified in FIG. 7. The requestors are identified as some utilization device 80 desiring access to the storage system 10 for the purpose of transferring a series of operands between the utilization device 80 and storage system 10. In this regard, a crosspoint 81 is provided for the purpose of communicating between a particular requestor and the storage module being accessed. The utilization device 80 could be nothing more than a separate storage buffer for each individual requestor or could be a representation of an input/output channel desiring access to the storage system 10. There is no requirement for, and there is no consideration given to, presenting corresponding elements of each of the data sequences simultaneously. The only concern is to detect, before access is started, a conflict for the first access by any of the requestors and resolving that by a number of initial access cycles such that once the conflict has been resolved, simultaneous access to all storage modules can be effected for the transfer of data between the storage system 10 and the utilization device 80.

As indicated earlier, element D1 and element A1 are located in the same storage module number 1. Therefore, it will be a requirement of the logic to provide access to the storage system for requestor D for a number of initial access cycles before the conflict is resolved between other elements of requestor D and other initial elements for requestors B and C. As shown in FIG. 7, element D1 is accessed on the first initial access cycle and the address incremented to permit access to element D2, and incremented once again to provide access to element D3 during the third initial access cycle. When element D3 has been accessed from storage module number 3 and the address for requestor D incremented, all four requestors will be desiring access to different storage modules. Therefore, at the cycle labeled basic 0, simultaneous access can be effected in the storage system 10 to provide access to elements A1, B1, C1 and D4. From this point on, simultaneous access can be continued. As the addresses are incremented for each of the requestors, there will not be a conflict for access to a storage module by more than one requestor.

Figure 8:
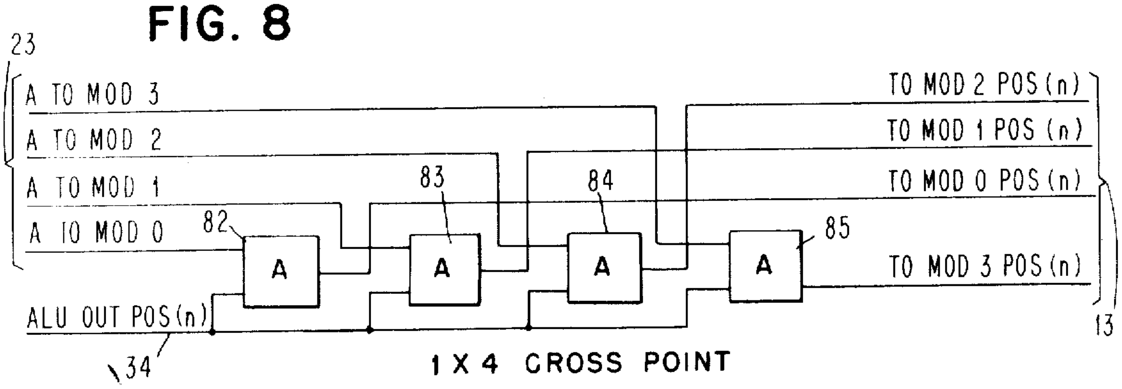
FIG. 8 is a logic diagram of the 1×4 crosspoint of FIG. 1.

FIG. 8 is a logic diagram of a single binary bit position of the 1 × 4 crosspoint 36 in FIG. 1. The function of the crosspoint 36 is to direct the output 34 of the ALU 30 to the proper storage module in accordance with the two low order bits of the requestor A address. The decoder representation of the storage module to be selected is applied as one input to a series of AND circuits 82 through 85. For example, if requestor A is accessing storage module number 2 for the storage of a result operand from ALU 30, AND circuit 84 will be enabled to pass the ALU bit position *n* output 34 through AND circuit 84 to the input bus 13 for bit position *n* of storage module number 2.

Figure 9:
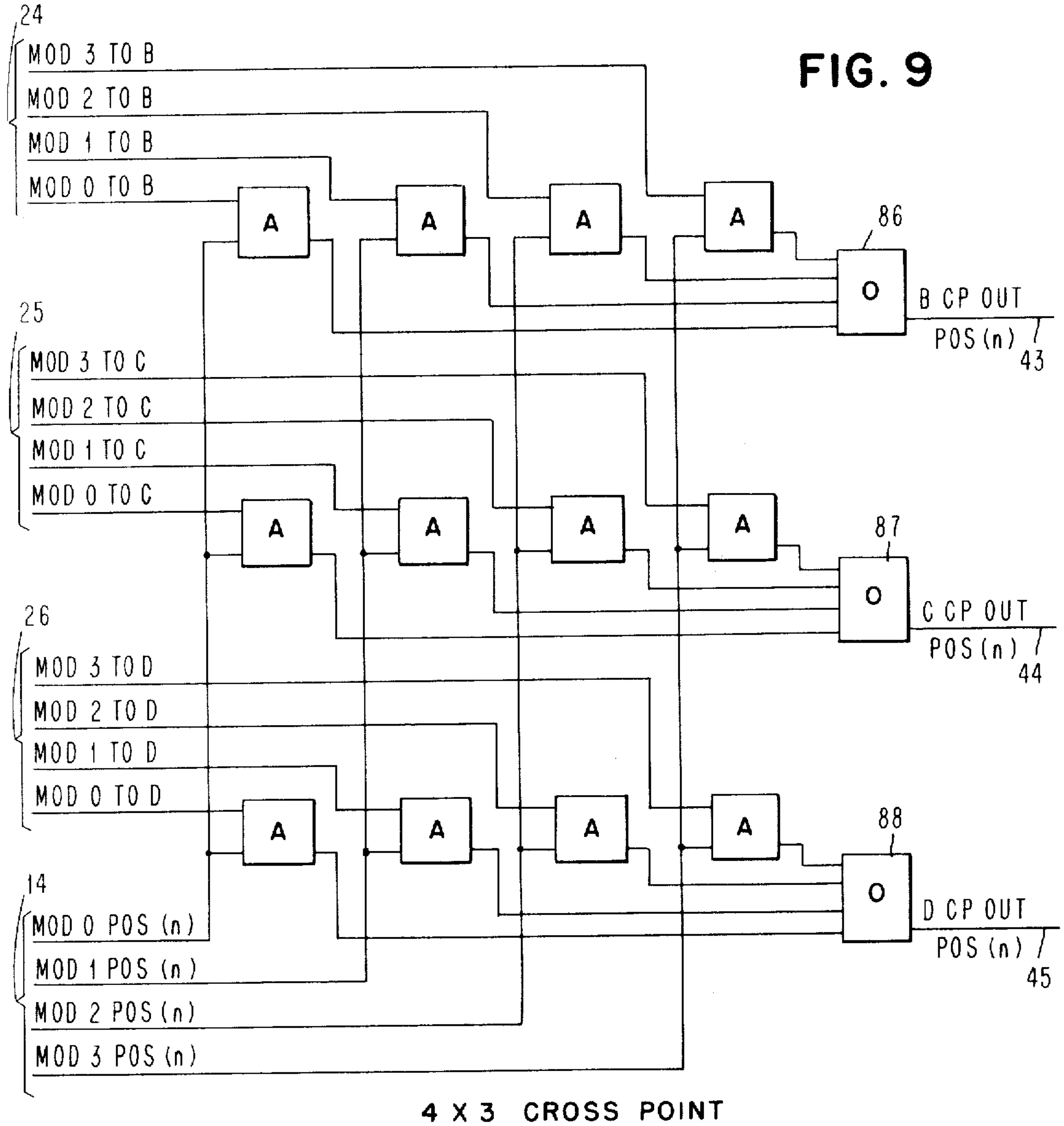
FIG. 9 is a logic diagram of the 4×3 crosspoint of FIG. 1.

FIG. 9 is a logical repesentation of the crosspoint switch 35 of FIG. 1 and functions essentially the same as that shown in FIG. 8. Only one binary bit position of a plural bit data operand is shown. The two low order bits of the address information for each of the requestors B, C, and D are utilized to enable a proper AND gate to accept the bit position *n* output 14 of a selected storage module for passage through a number of OR circuits 86, 87, and 88 to direct the data from each of the vectors B, C, and D respectively to the delay elements shown in FIG. 1.

FIGS. 10, 11, 12, and 13 are detailed logic diagrams of the initializer 20 and delay selector 22 of FIG. 1. In these diagrams, positive logic is assumed. That is, the satisfaction of a logic function is represented by a positive level and when the logic function is not satisfied, the level is negative. As indicated earlier, the initializer 20 and delay selector 22 in effect give preference to access to an initial storage module to requestor A, then B, then C, and then D.

Figure 10:
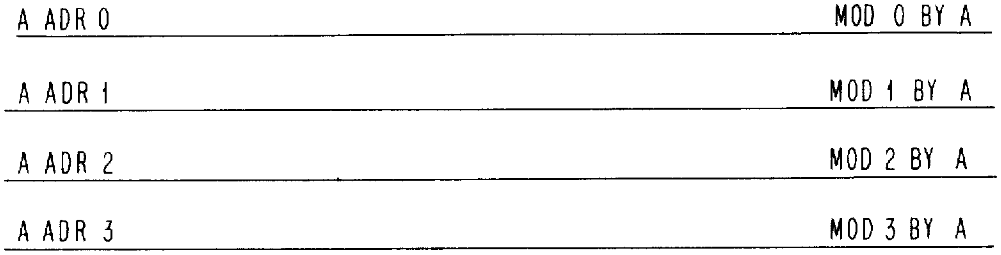
FIG. 10 is a logic diagram of the initializer of FIG. 1 for requestor A.

In FIG. 10, there is a representation that requestor A requests for initial access to storage modules 0, 1, 2, or 3 and is given preference and the decoded representation of the two low order bits of the requestor A address is passed to the logic associated with requestor B. The representation in FIG. 10 MOD 1 by A is the signal passed on to the logic for requestor B signifying that storage module 1 is busy. That is, assigned to register A for the first basic cycle of simultaneous access.

Figure 11:
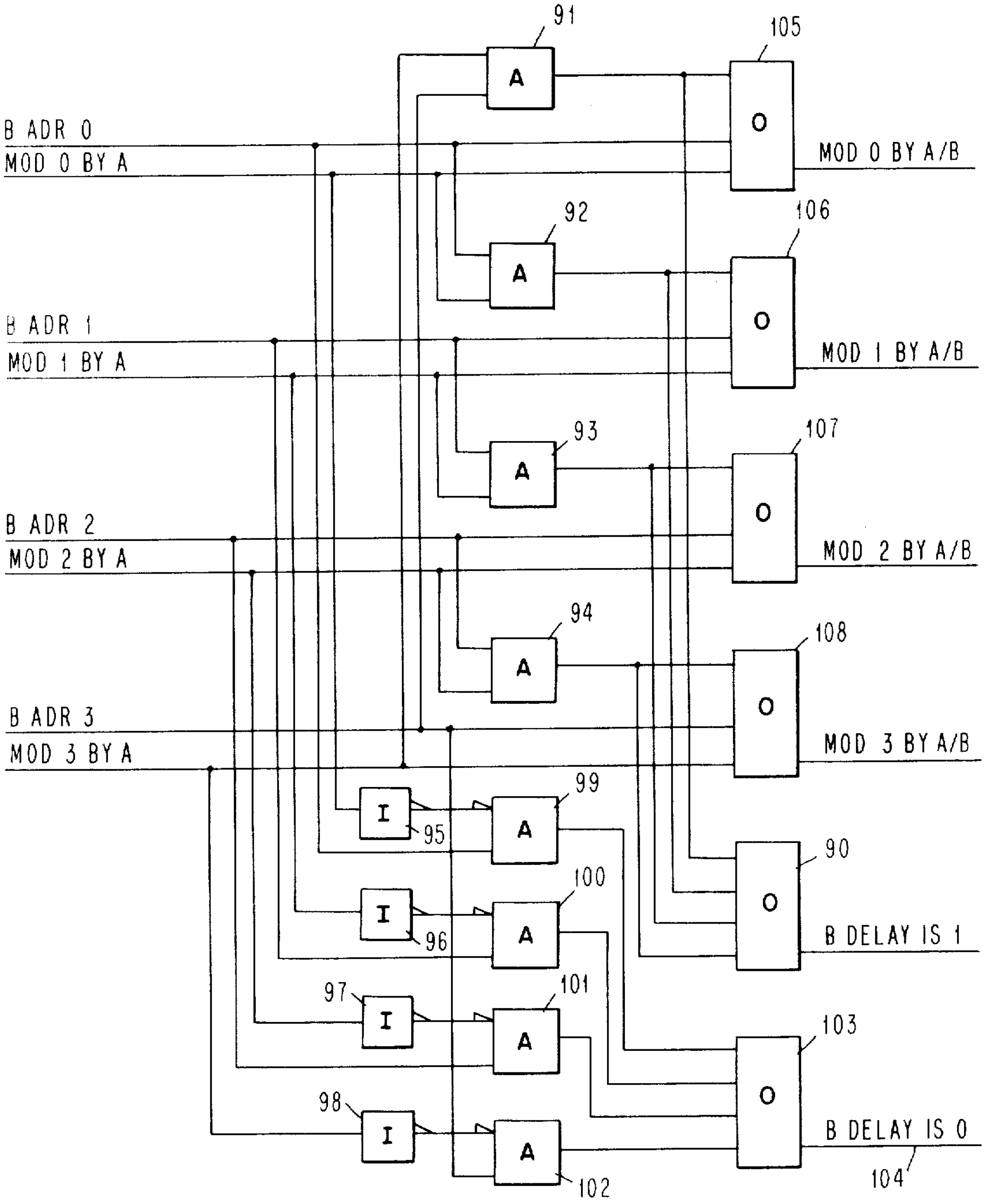
FIG. 11 is a logic diagram of the initializer of FIG. 1 for requestor B.

FIG. 11 is the logic which accepts the indication of the initial storage module assigned to requestor A and the decoded representation of the storage module number desired for the initial access by requestor B.

The need to provide one initial cycle of access for requestor B before initiating simultaneous access is indicated by an OR circuit 90. Inputs to OR circuit 90 are provided by AND gates 91 through 94 which, by means of the designations on the inputs to these AND circuits indicate that the initial storage module desired by requestor B is the same as that being accessed initially by requestor A.

Inverters 95 through 98, AND circuits 99–102, and OR circuit 103, indicate that the initial storage module being accessed by requestor B does not conflict with that being accessed by requestor A. Therefore an initial access cycle by requestor B prior to simultaneous access with requestor A is not required and the B delay is 0 and line 104 will be energized.

OR circuits 105, 106, 107, and 108 provide the signals necessary for resolving a conflict situation with requestor C. As an example, OR circuit 106 will signify to the logic associated with requestor C that assignment has already been made for use of storage module 1. That is, requestor B has provided an initial address to storage module 1, or that storage module 1 has been assigned to requestor A. The other input to OR circuit 106 is from AND circuit 92 which indicates to the logic for requestor C that storage module 0 has been assigned to requestor A and that requestor B also desires initial access to storage module 0. Requestor B must therefore be assigned storage module 1 as between requestor B and requestor C.

Figure 12A:
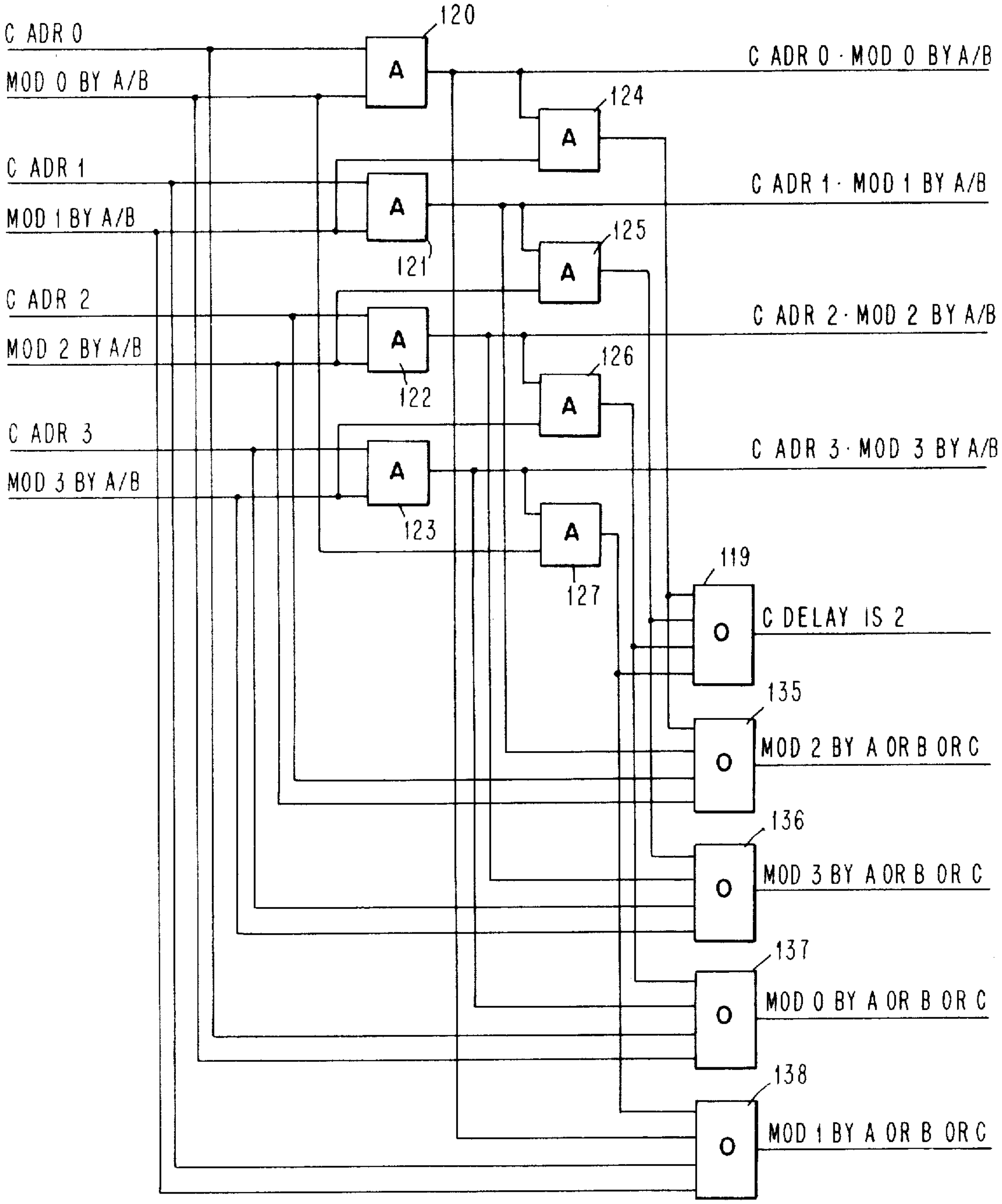
FIG. 12 is a logic diagram of the initializer of FIG. 1 for requestor C.
Figure 12B:
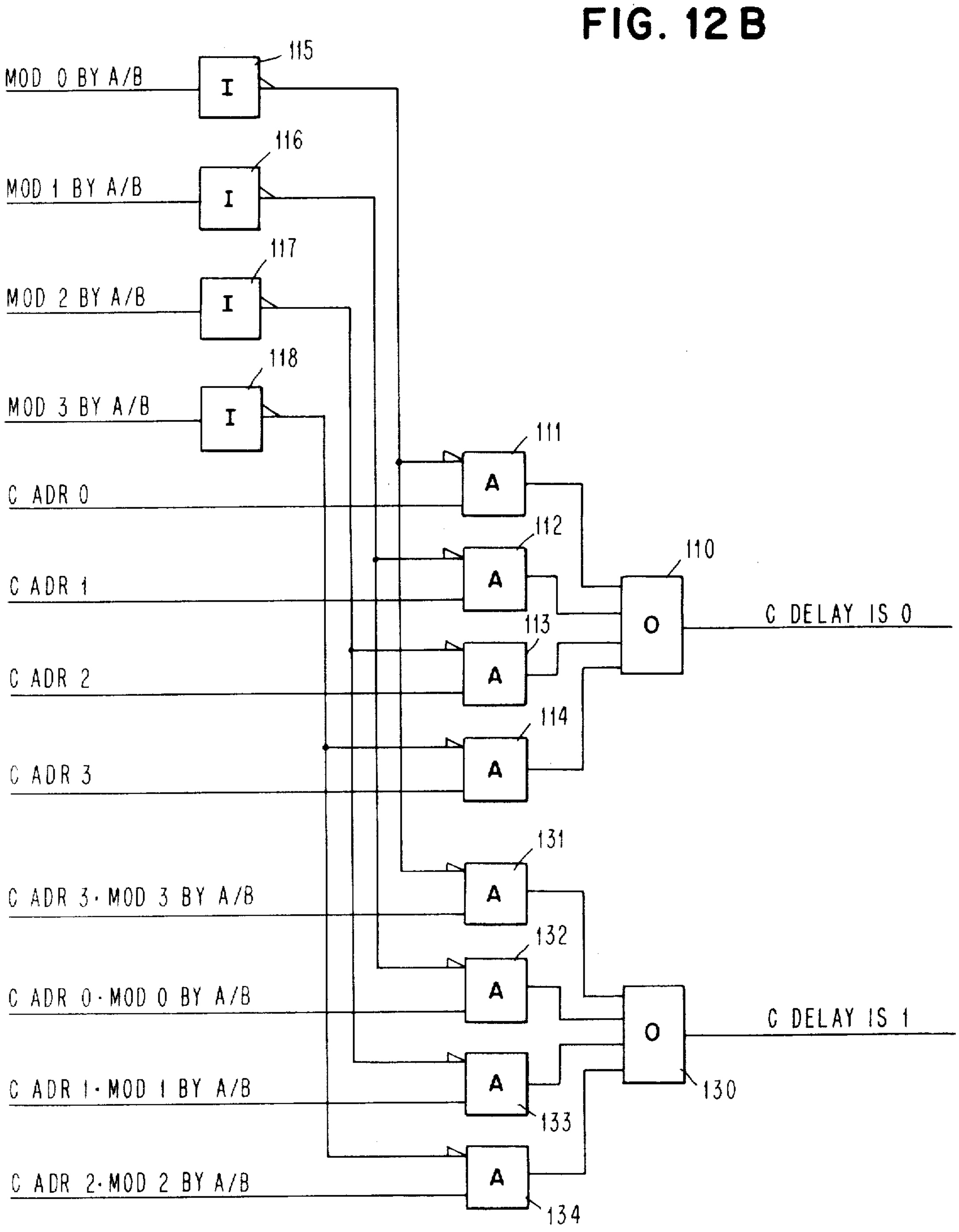

FIGS. 12A and 12B are the detailed logic associated with requestor C to resolve the amount of delay, or number of initial access cycles required for requestor C before simultaneous access can be effected. The inputs to this logic are the indications from the requestor B logic of FIG. 11 as to the storage modules which have already been assigned to the first basic cycle, and the decoded representation of the storage module of the initial access desired by requestor C. In FIG. 12B, OR circuit 110 provides an output to indicate that no initial access cycles are required for requestor C. This determination is made by AND circuits 111, 112, 113 and 114. The inputs to AND circuits 111–114 are provided by the decoded signal lines of the initial storage modules desired by requestor C and an indication through inverters 115–118 that the initial storage module desired by requestor C does not conflict with a storage module assigned to either requestor A or B.

In FIG. 12A, OR circuit 119 provides the signal necessary to indicate that requestor C must be given two initial access cycles prior to effecting simultaneous access in order to resolve a conflict. The combined logic of AND circuits 120–127 provide the necessary inputs to OR circuit 119. For example, AND circuit 125 receives as one input an indication that storage module number 2 has been assigned to either requestor A or B. The other input to AND circuit 125 is from AND circuit 121 which signifies that requestor C is desiring an initial accress to storage module number 1 but storage module number 1 has assigned to either requestor A or B. Therefore, AND circuit 125 provides an input to OR circuit 119 signifying that storage module 1 and storage module 2 have already been assigned and therefore requestor C must be advanced to access storage module 3 before access can be granted to storage modules 1 and 2 by requestor A and B.

The other possibility of initial accress requirements for requestor C is shown in FIG. 12B at OR circuit 130 which receives as inputs the result of logic indicated by AND circuits 131–134. For example, AND circuit 133 will indicate that requestor C must be given one initial access before simultaneous access can be effected when requestor C desired initial access to storage module 1 but storage module 1 has been assigned to requestors A or B and storage module 2 has not yet been assigned to either requestor A or B. Therefore, requestor C must only be advanced to storage module 2 before all conflicts have been resolved.

Finally, OR circuits 135–138 of FIG. 12A provide the necessary signals for application to the logic associated with requestor D to determine the amount of delay and number of initial access cycles required for requestor D to eliminate any conflicts. Again, by way of example, previous assignment for access to storage module 3 is indicated by OR circuit 136 which receives as two inputs either the fact that requestor C requires initial access to storage module 3 or that storage module 3 has already been assigned to requestors A or B. Also, prior assignment for access to storage module 3 will be indicated by AND circuit 122 or 125. AND circuits 122 and 125 indicate prior conflict resolution as between requestor C and requestors A or B for access to storage modules 1 or 2. Therefore, module 3 is reserved for requestor C as between C and D.

Figure 13A:
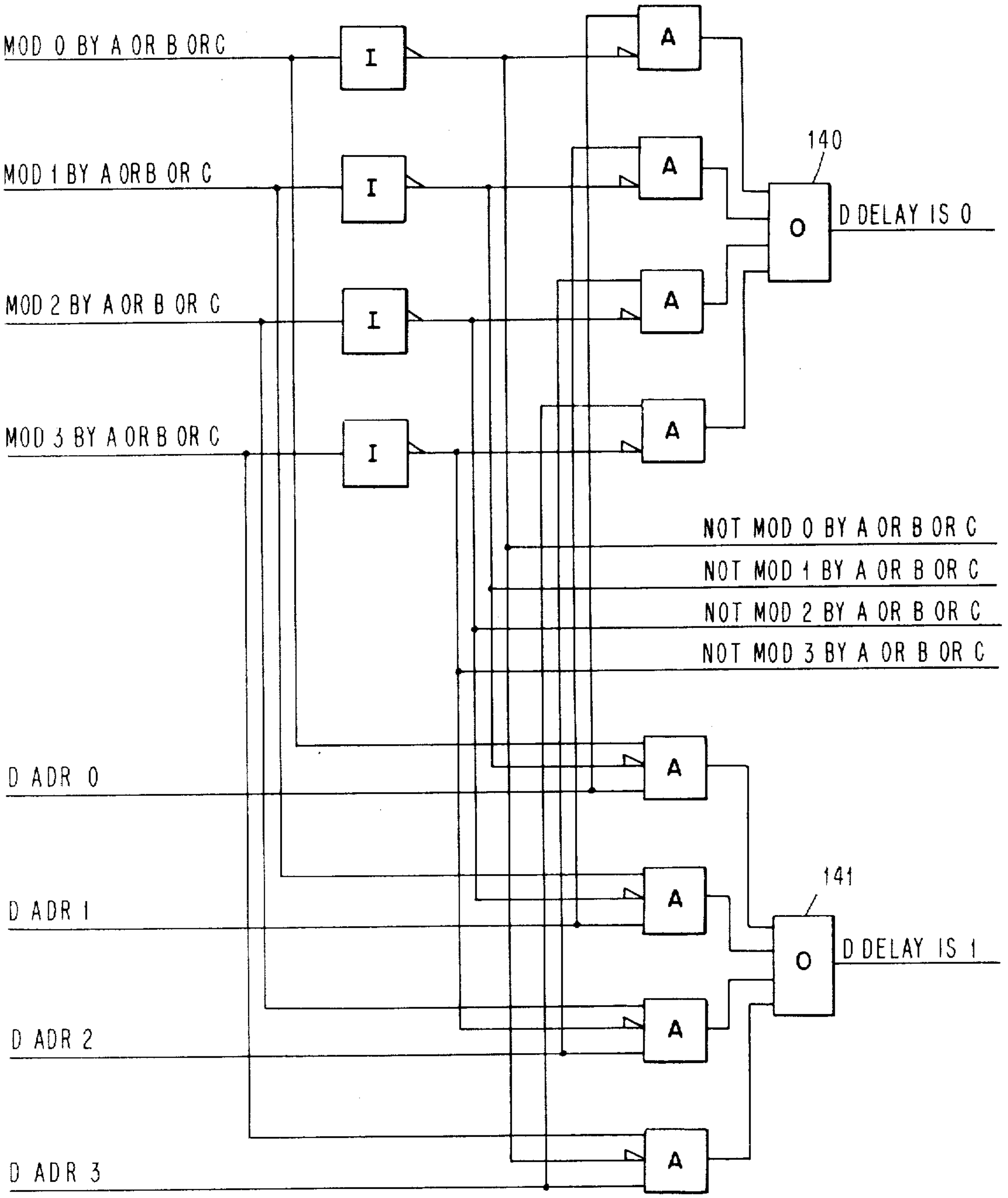
FIG. 13 is a logic diagram of the initializer of FIG. 1 for requestor D.
Figure 13B:
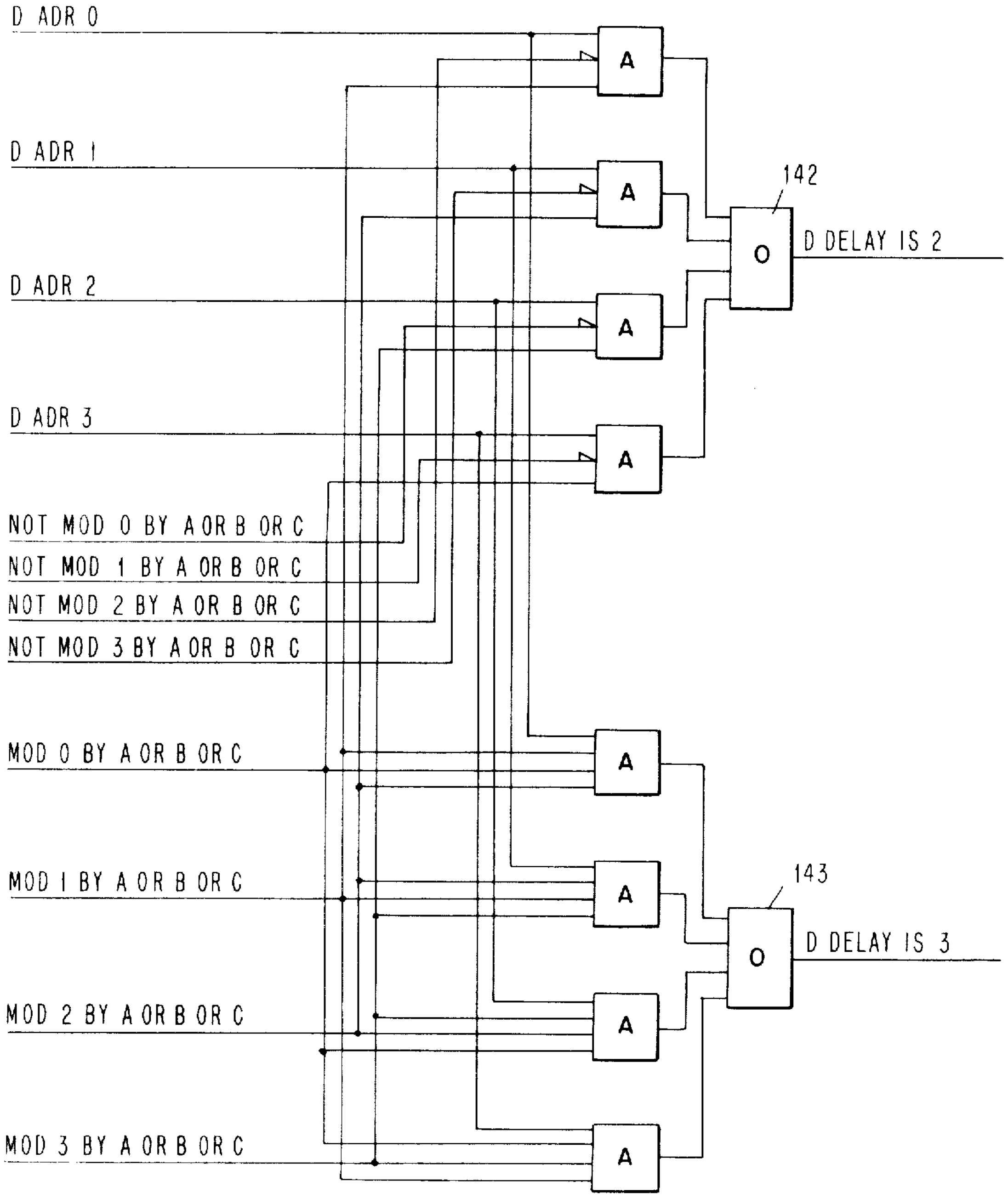

FIGS. 13A and 13B show the detailed logic for resolving the conflicts between requestors A, B, or C and the initial storage module desired by requestor D. The logic shown is essentially the same as that shown for the previous figures wherein OR circuits 140, 141, 142, and 143 receive as inputs logical AND functions of previous conflict resolutions for requestors A, B, and C. That is, the decoded value of the two low order bits of the requestor D initial access address is compared with signals indicating whether other requestors have been required to initiate an access to a particular storage module to resolve a prior conflict. As indicated earlier, requestor D may be required to advance its access by as many as three initial access cycles to eliminate conflicts with other requestors. Depending on the prior resolutions of conflicts, one of the OR circuits 140–143 will provide a logical output to select the proper amount of delay necessary as the input of the ALU 30 and will also determine the number of initial access cycles to be given requestor D to resolve conflicts before simultaneous access for all of the requestors can be effected.

Figure 14:
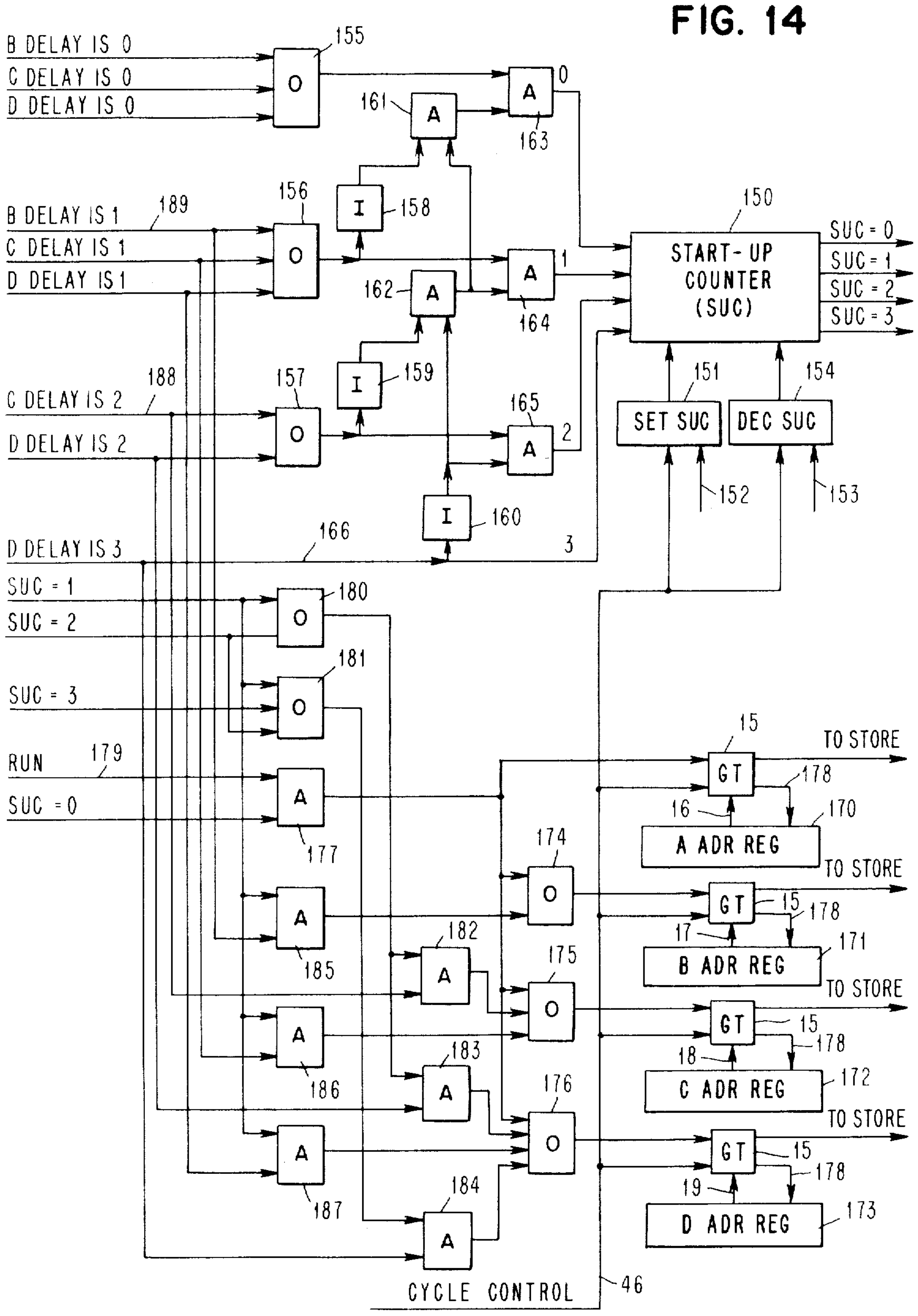
FIG. 14 is a logic diagram of the access control and address gates of FIG. 1.

FIG. 14 shows detailed logic concerned with the access control 21 of FIG. 1. The basic element of FIG. 14 is a Start-Up Counter (SUC) 150. The counter 150 may be any form of binary coded counter or ring counter which will be set by SET SUC logic 151 in response to a signal on a line 152 from the data processing system signifying an initializing operation. When all conflicts have been determined, and access is to be initiated, as signalled by a line 153 from the data processing system, decrement SUC logic 154 will be effective to decrement the Start-Up Counter 150 to 0.

The value set in the counter 150 is the largest of any of the delay values determined for requestors B, C, or D from the logic of FIGS. 10–13. The logic for effecting the setting of the Start-Up Counter 150 with the proper value includes OR circuits 155–157, inverters 158–160, and AND circuits 161–165. AND circuit 163 will cause the counter 150 to be set to 0 when AND circuit 161 is enabled. AND circuit 161 is only enabled if a delay of 1, 2, or 3 has not been indicated. The same form of inhibiting action occurs with AND circuits 164 and 165. In the case of AND circuits 164 and 165, inverter 160 will disable AND circuit 165, 162, and therefore 164 if the line 166 is energized indicating that the delay for requestor D is set to 3.

The remainder of FIG. 14 is effective to provide an ordered sequence of initial access cycles for particular ones of the requestors to eliminate the conflicts previously indicated before normal access, which is simultaneous access, is effected. The address information for each of the requestors A-D is inserted in address registers 170, 171, 172 and 173 respectively. The address gates 15 of FIG. 1 are shown to be responsive to the cycle control 46 to gate the address information for a particular requestor to storage. The time at which the gates are rendered effective during any initial access cycles, or when simultaneous access is effected, is provided by the output of OR curcyuts 174, 175, and 176, and AND circuit 177. As each of the gates 15 are rendered effective to transfer the address information from registers 170–173, a signal line 178 is enabled to provide the address incrementing function for each of the registers.

In the case of requestor A, the first access permitted occurs when the Start-Up Counter 150 equals 0 and the storage access mechanism is placed in a RUN condition as indicated on a line 179, It is to be recalled that the requestor A is never provided with any delay and therefore makes its initial access request on the first cycle in which simultaneous access is permitted. OR circuits 180 and 181 receive the Start-Up Counter 150 values 1, 2, and 3 which provide inputs to AND circuits 182, 183 and 184. The remaining logic of FIG. 14 includes AND circuits 185, 186, and 187.

The previously recited logic is effective to match the value of the Start-Up Counter 150 with the amount of delay determined for each of the requestors. As an example of the action of the logic of FIG. 14, reference to FIG. 6 is made where it was shown that all of the requestors desired initial access to storage module number 2. In this instance, line 166 would be energized to indicate that the delay for requestor D is 3 thereby providing an input to AND circuit 184. Line 188 will be energized indicating that the delay for requestor C is 2. Therefore, AND circuit 182 will be enabled by line 188 and AND circuit 185 will be enabled by line 189 indicating the delay for requestor B is 1.

In this example, the Start-Up Counter 150 will be provided with a value of 3 such that on all three of the initial access cycles, AND circuit 184 will pass a signal through OR circuit 176 to gate and increment the address for requestor D. AND circuit 184 will receive an enabling signal from OR circuit 181 on all three Start-Up Counter cycles. With regard to requestor C, AND circuit 182 will pass a signal through OR circuit 175 to increment and gate the address of requestor C to storage as a result of signals from OR circuit 180 for the initial cycles 2 and 1. The address for requestor B will be transferred to storage and incremented in response to a signal from AND circuit 185 through OR circuit 174 when the Start-Up Counter value is 1. At the completion of the three initial access cycles, the Start-Up Counter 150 will have decremented to 0 enabling AND circuit 177 to thereby maintain all the address gates 15 enabled to respond to each cycle control 46 to gate and increment the address information for all of the requestors A through D.

There has thus been shown a storage system which permits random distribution of the starting address of a plurality of operand sequences. Simultaneous access to the storage system is provided for a plurality of requestors, each seeking a particular one of the data sequences. By examining the starting address of all of the requestors, conflicts for an initial access to the storage system as between two requestors can be resolved. A number of initial access cycles for individual requestors, in a predetermined sequence, eliminates the conflict such that subsequent simultaneous access can be provided for all requestors to the storage system. The determination of which requestors are to be given initial access cycles and the number of cycles required is the essential feature of the present invention. When this storage system access method is applied to vector processing, which is the preferred embodiment for the invention, the address conflict determination also determines the amount of delay to be applied to the various elements of vectors to insure that corresponding elements to all vectors arrive at a processing station simultaneously. Outside of this environement, when the time of arrival of corresponding elements of a series of data operands is not critical to utilization means, only the address sequencing is required. In addition, the same philosophy can be applied to a storage system where plural channels present operands simultaneously for storage in the storage system. Initial address conflicts are resolved, proper address sequencing is initiated and delay intervals are applied in the data path of the simultaneously applied operands to allow simulaneous access to the storage system for all of the channels once the conflicts have been resolved.

Other aspects of data processing systems suggest additional uses or modifications to the use of the logic shown in FIG. 3. Data processing systems include a number of resources such as I/O devices, program modules, data sets, etc. which must be assigned for use by a plurality of users or requestors of the resources. It is desirable to permit each of the requestors to use their own identification of the resource which each desires to utilize, and leave the assignment of the resource to the data processing system. That is, if each of a plurality of requestors, at some point in time, provide a request for the use of a resource which each has identified as resource number 1, a method must be provided for resolving this conflict of requests and assign one of a plurality of the resources to each of the requestors and provide an indication of the difference between the resource requested and the resource actually assigned to the requestor.

This desirable function in a data processing system can be performed by the logic shown in FIGS. 10–13. In these figures, the requestors are provided with a priority for assignment of resources. That is, requestor A is given the highest priority for assignment and this determination is made in FIG. 10. In FIG. 11, the decision is made for requestor B as to whether or not the resource requested is the same as that requested by requestor A. If not, the output of OR circuit 103 will indicate that the resource assigned to requestor B is the same as that requested. If requestor B indicates the same resource as requestor A, OR circuit 90 will produce an output indicating that the resource indication presented by requestor B has been modified by 1. The same logic follows in the operation of FIGS. 12 and 13 wherein the deviation between the resource indicated by requestor C may be modified by 0, 1, or 2, and for requestor D the difference between the resource requested and the resource actually assigned will be 0, 1, 2, or 3. These outputs, which in the preferred embodiment determine address sequencing for initial access cycles and the amount of delay to be introduced in the data path, can then be utilized in any suitable fashion by the data processing system for noting the difference between a resource requested by a user and the resource actually assigned.

What is claimed is:

1. A storage system comprising:

a plurality of random access storage modules, each having addressing means, a plurality of addressable storage locations for the storage of data, and storage bus means for storing data in or fetching data from said addressable storage locations;

a plurality of requestors requiring access to the storage system, each requestor including address register means connected to said addressing means of each of said random access storage modules for transferring to the storage system, addresses comprised of a first part for selecting one of said storage modules and a second part for selecting an addressable storage location within said storage modules, each said requestor further including means to increment said address register means after each access to thereby obtain access to a sequence of addressable storage locations, which sequence proceeds from an initial one of said storage modules, through the remainder of said storage modules in a repeated sequence;

initializing means connected to said address register means, operative prior to access by said requestors, and responsive to said first address part from all said requestors, for providing an identity signal when there is identity between said first address part from two or more of said requestors; and control means, connected to said initializing means and said address register means of said requestors, including initial access control means for providing a predetermined number of initial accesses to said storage modules by said requestors with initial address identity, on a priority basis, and including normal access control means, operative after said predetermined number of initial accesses, for providing simultaneous access to said storage modules by all said requestors.

2. A storage system in accordance with claim 1 including requestor bus means, one for each of said requestors; and switch means, connected and responsive to said address register means of each said requestors, including means responsive to said first address part to selectively interconnect said requestor bus means and said storage bus means of each said storage modules.

3. A storage system in accordance with claim 2 wherein:

the number of said requestors is equal to or less than the number of said storage modules.

4. A storage system in accordance with claim 3 wherein:

the number of said requestors and said storage modules is *n;* and

*n*–1 of said requestor bus means each include delay means, connected and responsive to said initializing means, for adjusting the time interval required for data to pass between said requestors and said storage modules.

5. A storage system in accordance with claim 4 wherein:

said storage modules each have an access cycle time of $t$;

said delay means of said $n-1$ of said requestor bus means include selectable delay elements providing selectable delays in the following pattern:

0 or 1$t$ delay in a first of said $n-1$ requestor bus means,

0, 1$t$, or 2$t$ delay in a second of said $n-1$ requestor bus means, and

0, 1$t$, 2$t$, . . . ., *or* $(n-1)t$ delays in said $n-1$ requestor bus means and further including;

delay selection means, connected and responsive to said initializing means, operative to select the pattern of delay elements for each requestor in accordance with the predetermined number of initial accesses provided by said initial access control means.

6. A storage system in accordance with claim 5 wherein:

said $n-1$ requestor bus means are each associated with one of said requestors requiring access to the storage system for fetching data from said addressable storage locations; and the other of said requestor bus means is associated with one of said requestors requiring access to the storage system for storing data in said addressable storage locations.

7. A storage system in accordance with claim 6 wherein:

said $n-1$ requestors are each an input to an arithmetic and logic unit; and the other of said requestors is the output of the arithmetic and logic unit.

8. A conflict resolving system comprising:

a plurality of resources in a numbered sequence;

a plurality of requestors having assigned priorities;

indicating means, associated with each said requestor, for specifying a particular one of said resources desired for utilization;

assigning means connected to said indicating means for assigning to each of said requestors, in the order of priorities, the particular one of said resources specified or another of said resources in said numbered sequence not previously assigned to one of said requestors with higher priority; and means, connected and responsive to said assigning means, for modifying said indicating means of said requestors in accordance with the difference between the particular one of said resources specified by each of said requestors and the one of said resources assigned.

* * * * *